O. A. WIBERG.
STEAM OR GAS TURBINE PLANT.
APPLICATION FILED SEPT. 8, 1919.

1,335,775.

Patented Apr. 6, 1920.

Inventor
Oscar Anton Wiberg
by Henry Orth Jr
atty

UNITED STATES PATENT OFFICE.

OSCAR ANTON WIBERG, OF FINSPONG, SWEDEN, ASSIGNOR TO SVENSKA TURBIN-FABRIKS AKTIEBOLAGET LJUNGSTRÖM, OF FINSPONG, SWEDEN.

STEAM OR GAS TURBINE PLANT.

1,335,775.   Specification of Letters Patent.   Patented Apr. 6, 1920.

Application filed September 8, 1919.   Serial No. 322,599.

*To all whom it may concern:*

Be it known that I, OSCAR ANTON WIBERG, a citizen of the Kingdom of Sweden, residing at Finspong, Sweden, have invented new and useful Improvements in Steam or Gas Turbine Plants, of which the following is a specification.

In my copending U. S. patent application Serial No. 322,599, filed June 10/19 a steam or gas turbine plant is described, comprising a high pressure member and a low pressure member, the high pressure member consisting of an impulse turbine of the axial type, while the low pressure member consists of a double rotating radial turbine which may or may not be provided with radially extending blades. According to the patent application above referred to the shaft of the high pressure turbine may either be mechanically connected directly to one of the shafts of the low pressure member or it may be connected thereto through the intermedium of a suitable gearing. From one of the shafts so connected the power is supplied by means of a toothed gearing to any suitable intermediate shaft or driven shaft, the other shaft of the low pressure turbine being connected through a separate toothed gearing to the said intermediate shaft or driven shaft. It is obvious that in such case the said first-mentioned gearing must be formed with a width considerably greater than that of the said last-mentioned gearing, as the pinion forming part of the said first-mentioned gearing has to transmit a much greater power than the pinion forming part of the said last-mentioned gearing.

In order to overcome said inconvenience and thus permit the use of toothed gearings having equal dimensions for the transmission of power to the intermediate shaft or driven shaft the low pressure turbine according to this invention is connected by means of a separate pinion to the toothed gearing common to the whole turbine plant.

Figure 1:
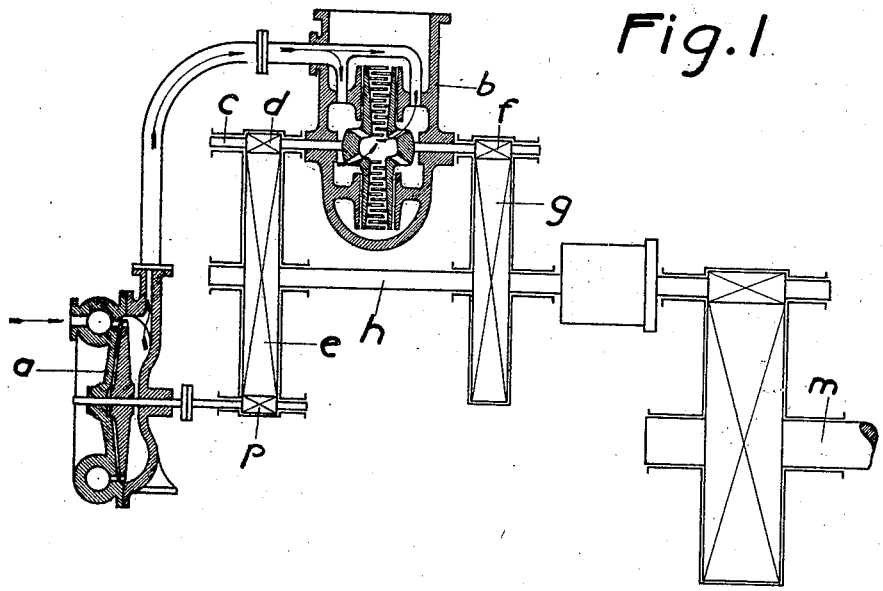
Figure 2:
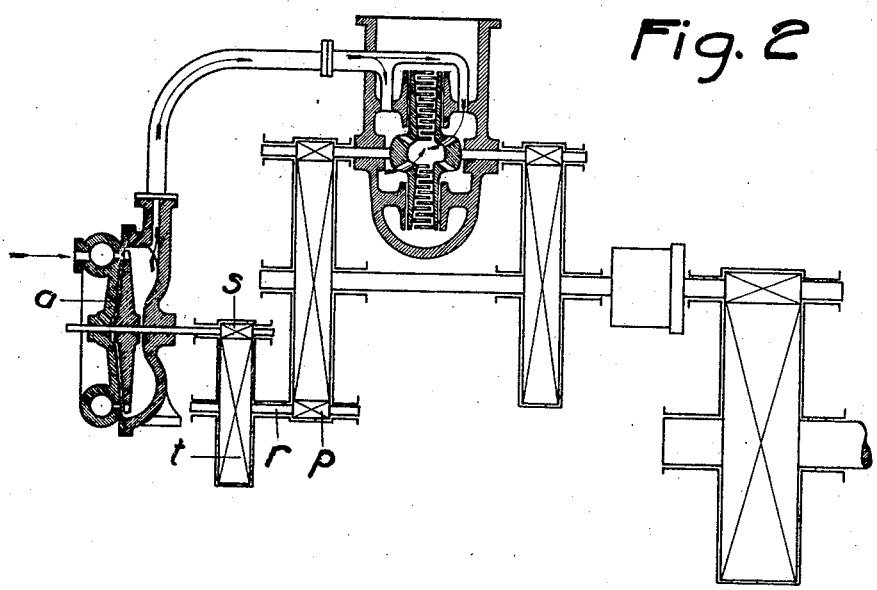

In the accompanying drawings, Figures 1 and 2 illustrate diagrammatically two embodiments of the invention.

In the embodiment shown in Fig. 1 the shaft of the high pressure turbine or impulse turbine $a$ is provided with a pinion $p$, meshing with a toothed wheel $e$ on the intermediate shaft $h$. The shaft of the double rotating turbine $b$ forming the low pressure member of the plant carries a pinion $d$ likewise meshing with the toothed wheel $e$. The other shaft of the turbine $b$ is connected through the toothed gearing $f, g$ to the shaft $h$, which is connected to the driven shaft $m$ as in the patent application above referred to.

The embodiment shown in Fig. 2 corresponds to the embodiment above described with the exception that for permitting a greater speed of the high pressure turbine $a$ the pinion $p$ is not mounted on the shaft of the turbine $a$ but on an intermediate shaft $r$, connected by means of a gearing $t, s$ to the shaft of the turbine $a$.

Having now particularly described and ascertained the nature of my said invention and in what manner the same is to be performed, I declare that what I claim is:—

1. A turbine plant for steam or gas, comprising in combination a high pressure member consisting of an impulse turbine of the axial type, a low pressure member, consisting of a radial turbine of the double rotating type, having two shafts rotating in opposite directions, a toothed gearing common to said two shafts, and a separate pinion connecting the high pressure turbine to said toothed gearing.

2. A turbine plant for steam or gas, comprising in combination a high pressure member consisting of an impulse turbine of the axial type, a low pressure member consisting of a radial turbine of the double rotating type having two shafts rotating in opposite directions, toothed gearings connecting the said two shafts to a common driven shaft, another toothed gearing connecting the high pressure member to an intermediate shaft, a pinion connecting said intermediate shaft with one of said first-mentioned toothed gearings.

In testimony whereof I have signed my name.

OSCAR ANTON WIBERG.